United States Patent
Muthukumaran et al.

(10) Patent No.: US 8,097,826 B2
(45) Date of Patent: Jan. 17, 2012

(54) PENETRATION ENHANCING FLUX FORMULATION FOR TUNGSTEN INERT GAS (TIG) WELDING OF AUSTENITIC STAINLESS STEEL AND ITS APPLICATION

(75) Inventors: Vasudevan Muthukumaran, Tamil Nadu (IN); Arun Kumar Bhaduri, Tamil Nadu (IN); Baldev Raj, Tamil Nadu (IN)

(73) Assignee: The Secretary, Department of Atomic Energy, Government of India, Mumbai (IN)

( * ) Notice: Subject to any disclaimer, the term of this patent is extended or adjusted under 35 U.S.C. 154(b) by 0 days.

(21) Appl. No.: 12/063,664

(22) PCT Filed: Nov. 8, 2006

(86) PCT No.: PCT/IN2006/000442
§ 371 (c)(1),
(2), (4) Date: Feb. 12, 2008

(87) PCT Pub. No.: WO2008/056371
PCT Pub. Date: May 15, 2008

(65) Prior Publication Data
US 2010/0068559 A1 Mar. 18, 2010

(51) Int. Cl.
*B23K 35/38* (2006.01)
*B23K 9/16* (2006.01)
*B23K 9/24* (2006.01)

(52) U.S. Cl. .................. 219/75; 219/137 R; 219/145.23

(58) Field of Classification Search .................... 219/57, 219/74, 75, 130.1, 137 PS, 137 WM, 146.31, 219/137 R, 145.23; 148/22, 23
See application file for complete search history.

(56) References Cited

U.S. PATENT DOCUMENTS

| | | | | |
|---|---|---|---|---|
| 2,141,929 A | * | 12/1938 | Moritz | 428/384 |
| 4,503,314 A | * | 3/1985 | Kakimi et al. | 219/121.14 |
| 4,525,620 A | * | 6/1985 | Deverell et al. | 219/137 WM |
| 5,804,792 A | | 9/1998 | Paskell | |
| 6,664,508 B1 | | 12/2003 | Johnson et al. | |
| 6,707,005 B1 | * | 3/2004 | Johnson et al. | 219/146.31 |
| 6,884,963 B1 | * | 4/2005 | Ames et al. | 219/137 WM |
| 2004/0018931 A1 | * | 1/2004 | Sridharan et al. | 501/21 |
| 2005/0199317 A1 | * | 9/2005 | Chou et al. | 148/26 |
| 2005/0217757 A1 | * | 10/2005 | Miyano | 148/24 |

* cited by examiner

*Primary Examiner* — M. Alexandra Elve
(74) *Attorney, Agent, or Firm* — Patent Central LLC; Stephan A. Pendorf

(57) ABSTRACT

A Penetration Enhancing Activating Flux (PEAF) in paste form for autogenous TIG welding of austenitic stainless steels adapted for ready application with a brush on top weld surface prior to conducting autogenous TIG welding to favor single weld pass, of austenitic stainless steels of AISI 304LN and AISI 316LN varieties with weld bead penetration up to a section thickness of 12 mm. Importantly, the (PEAF) paste based TIG welding of the invention achieves an increase in weld bead penetration of about 300% over the conventional TIG process without activating flux. The PEAF paste based TIG welding also favors higher productivity and high quality apart from being cost-effective due to less requirement of consumables and controlled heat input to arrest distortion, making it widely acceptable for variety of industrial applications for welding of austenitic stainless steel.

15 Claims, 4 Drawing Sheets

Figure 1:
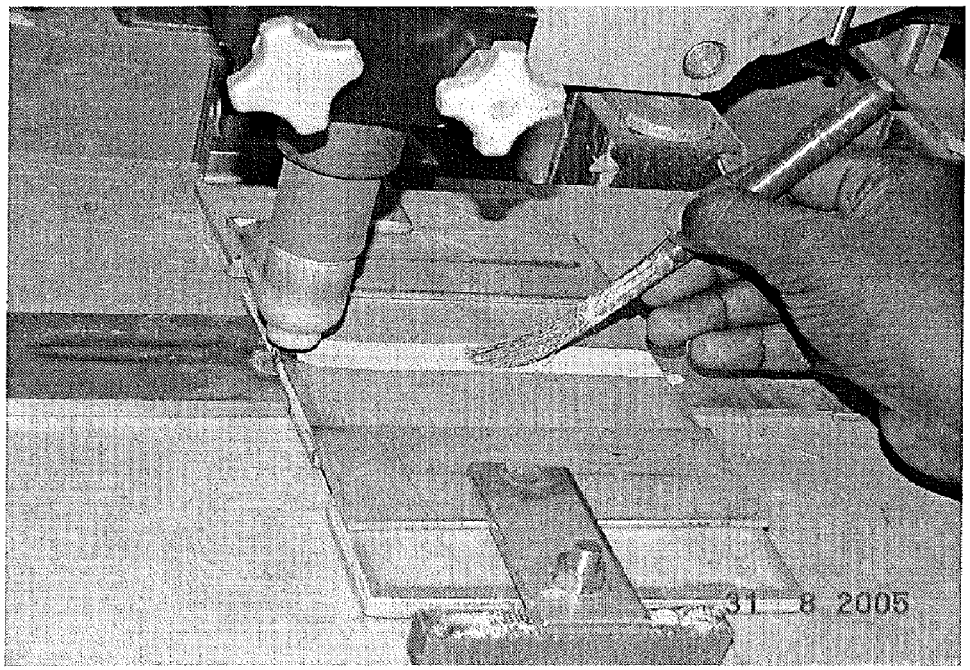
Figure 1:
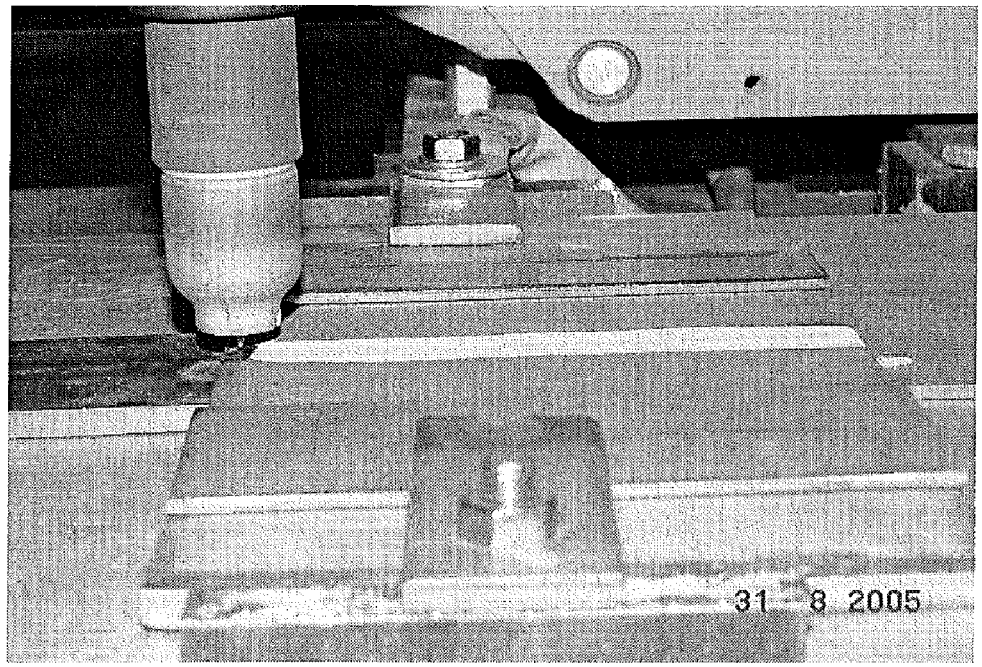
Figure 1:
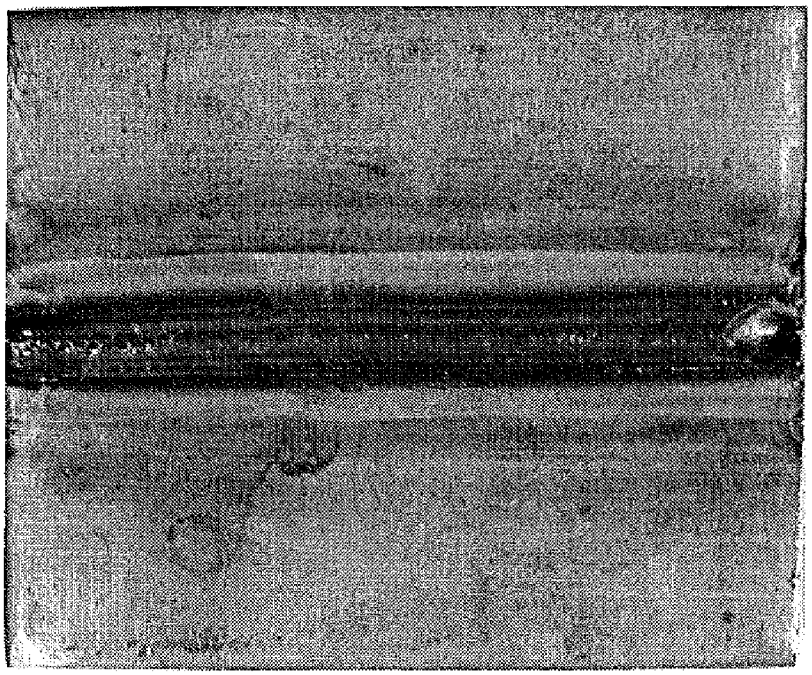
Figure 1:
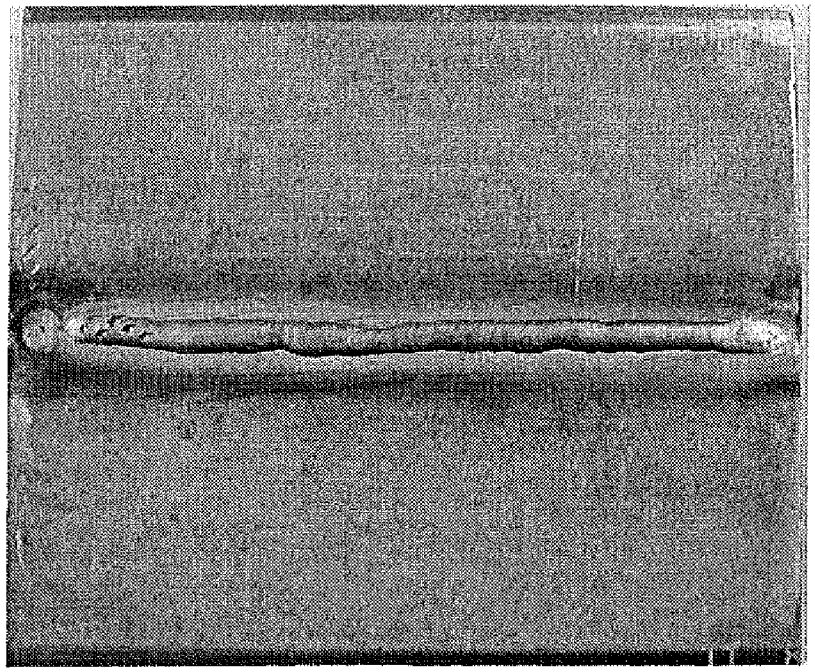

PENETRATION ENHANCING FLUX FORMULATION FOR TUNGSTEN INERT GAS (TIG) WELDING OF AUSTENITIC STAINLESS STEEL AND ITS APPLICATION

FIELD OF INVENTION

The present invention is directed to a flux formulation and in particular to a Penetration Enhancing Activating Flux (PEAF) formulation preferably obtained as paste and to a method of carrying out Tungsten Inert Gas (TIG) welding or alternatively termed, Gas Tungsten Arc Welding (GTAW) of Stainless Steels of grades and composition conforming to austenitic stainless steel especially the Standards AISI 304 and AISI 316. Importantly, the penetration enhancing activating flux (PEAF) formulation of the invention favours obtaining consistently superior weld quality, of section thickness up to around 12 mm in single pass welding, with an enhancement of about 300% weld penetration, as compared to conventional similar TIG welding applications. Advantageously, also the present invention would favour reducing the requirement of consumable filler material while carrying out TIG welding of austenitic stainless steel of section thickness above 3 mm, being the limit of penetration achieved in conventional TIG welding, and to reduce the number of weld passes. The penetration enhancing activating flux formulation would ensure radiographic quality welds with higher productivity and reduced overall welding costs without sacrificing important mechanical properties and the desired microstructure of the weld zone. The PEAF paste of the invention for the autogenous TIG welding process also mitigates the problem faced in the art of variable weld bead penetration with the variation in the base metal composition from one heat to the another.

BACKGROUND AND PRIOR ART

Tungsten Inert Gas (TIG) Welding is widely applied in the fabrication of steels of various compositions and grades, and specially in welding of austenitic stainless steel components, in various industry sectors including Nuclear industry, Ship building, Chemical, Petrochemical, Power, Transportation, Automobile and their ancillary industries, in manufacturing as well as in maintenance jobs. The TIG welding process is considered as a reliable process for welding of a large variety of metals and alloys to ensure superior and almost defect free weld quality as the weld pool and the arc remain under the cover of inert envelop of argon gas and preferably applied as root pass for butt welded joint for difficult to access weld locations, where repair would be very difficult and costly. The TIG process is applied with or without the filler wire for a particular base metal composition, standard sections or cast or forged items. TIG welding is exclusively applied for welding of austenitic stainless steels to achieve defect free weld without degradation of mechanical properties and desirable microstructure.

The conventional TIG welding process, when applied for autogenous (i.e. without the addition of any filler material) weld bead of only 3 mm is achievable in austenitic stainless steels, in absence of use of any penetration activating flux. Some variation in weld penetration is found in such conventional autogenous TIG welding applications due to the variations in the composition of the base metal from one heat to another heat. Control on these variations and the enhanced penetration can only be effected by the use of activating flux of suitable composition deciding the desired end results of a TIG welded Joints, in terms of strength, microstructure, homogeneity and reliability in service. Hence there has been a need in the art to develop a flux for autogenous TIG welding specially of austenitic stainless steels that would favour controlling the afore discussed limitations and complexities of conventionally followed TIG welding applications and especially to improve upon the limit of penetration in the existing practice to further improve upon the productivity without affecting the quality of the weld.

U.S. Pat. No. 5,804,792 discloses an easy to apply flux for increasing the penetration of gas tungsten arc welding of stainless steel substantially independent of flux thickness and variations in composition from heat to heat of stainless steel includes a flux consisting of reagent or laboratory grade TiO or $TiO_2$ (about 50%), $Cr_2O_3$ (about 40%), and $SiO_2$ (about 10%) in a liquid carrier, preferably of methyl ethyl ketone. The flux is stated to be easy to apply, increases penetration of the weld, decreases bead width, and increases weld cross sectional area. This Patent, however, is basically on the use of GTAW flux having enhanced penetration upto 6 mm in AISI type 304 stainless steel.

U.S. Pat. No. 6,664,508 discloses Deep penetration gas tungsten arc welds are achieved using titanates such as $Na_2Ti_3O_7$ or $K_2TiO_3$. A small amount of the titanate is applied to the weld zone in a carrier fluid paste or as part of a wire filler to afford deep penetration welds in carbon, chrome-molybdenum, and stainless steels as well as nickel-based alloys. To control arc wander, bead consistency, and slag and surface appearance of the weldments, various additional components may be optionally added to the titanate flux including transition metal oxides such as TiO, $TiO_2$, $Cr_2O_3$, and $Fe_2O_3$, silicon dioxide, manganese silicides, fluorides and chlorides. However, the toxicity of the plumes from halide additives and the necessity of post-weld removal to prevent corrosion may preclude their use. In addition, it was found that a flux of titanium oxides, $Fe_2O_3$ and $Cr_2O_3$ affords deep weld penetration in carbon steels and nickel-based alloys but with some heat-to-heat variation.

U.S. Pat. No. 6,707,005 is directed to deep penetration gas tungsten arc welds are achieved using weld penetration containing one or more compounds selected from the group of compounds consisting of (a) a titanium oxide, (b) nickel oxide, (c) a metal silicide, and (d) mixtures of these compounds a flux containing at least two titanium oxides, nickel oxide, and a manganese silicide is particularly useful for welding a wide variety of material including nickel-based alloys and carbon and stainless steels. The flux can be applied as a paste, as part of a cored wire or rod coated on the exterior of a filler wire or rod. Alternatively, it can be mixed with a polymeric binder and applied to the weld zone as a hot melt, paint, tape, adhesive, rod, wire or a stick.

The above discussed prior U.S. Pat. Nos. 6,664,508 and 6,707,005 are found to claim use of penetration flux having enhanced penetration upto 10 mm in nickel base alloys and steels. While, the flux is attended to work also in case of austenitic stainless steel, the maximum penetration achieved was limited to 10 mm. However none of the above cited patent documents in related area, disclosed prior use of autogenous TIG process in single pass weld to improve welding productivity for such application, in addition to the objective of enhancement of weld penetration.

Thus there remains a continuing requirement in the art of TIG welding to achieve even greater penetration levels of welding involving penetration activating fluxes without affecting the quality of the weld to favour varied end use and applications and also to improve upon the productivity for welding by greater penetration of weld without degrading the microstructure and mechanical properties.

OBJECTS OF THE INVENTION

It is thus the basic object of the present invention to provide for enhanced penetration in single pass TIG welding involving selective penetration activating flux without addition of any filler material i.e. autogenous TIG welding achieving a penetration of greater than 3 mm and even upto 12 mm in a single welding pass and thereby improve productivity in the welding of such austenitic stainless steel.

Another object of the present invention is directed to the development of penetration enhancing activating flux composition for TIG welding which would favour enhancing the depth of penetration by about 300% as compared to conventional TIG processes applied without activating flux Yet another object of the present invention is directed to a penetration enhancing activating flux composition adapted for obtaining enhanced weld bead penetration during autogenous TIG welding of austenitic stainless steel which would favour achieving a penetration of greater than 3 mm and even upto 12 mm in a single welding pass and thereby improve productivity in the welding of such austenitic stainless steel.

A further object of the present invention is directed to a penetration enhancing activating flux in paste form which can be applied simply by brush and the like prior to welding of components using TIG welding torch favouring enhanced penetration and productivity of welding.

A further object of the present invention is directed to a method of TIG welding involving a penetration enhancing activating flux paste adapted to eliminate the effect of heat to heat variation in the base metal composition on the penetration in autogenous TIG welding.

Yet another object of the present invention is directed to developing selective welding parameters for achieving upto about 12 mm weld bead penetration in single-pass autogenous TIG welding.

A further object of the present invention is directed to achieve penetration enhancing activating flux paste based welding of plates of thicknesses in the range of 9 mm and upto 12 mm involving back-up strip during penetration enhancing activating flux—TIG welding to prevent melt through during the welding operation without the need for any back purging of Argon.

Another object of the present invention is directed to eliminate the requirement of consumables or filler wire for welding section thickness upto 12 mm in austenitic stainless steels.

A further object of the present invention is directed to reduce heat input for achieving a desired weld bead penetration, reduce distortion in welded joints, reduce cost towards weld joint edge penetration and overall reduction of welding time and cost.

A further object of the present invention is directed to improve upon the productivity of the existing TIG welding process by reducing the number of passes and executing square butt welds up to a section thickness of 12 mm in a single pass by the application of autogenous TIG welding involving a selective PEAF paste and thus reduced the overall welding time and costs.

SUMMARY OF THE INVENTION

Thus according to the basic aspect of the present invention there is provided a penetration enhancing activating flux formulation for Tungsten Inert Gas (TIG) welding of Austenitic Stainless Steel comprising:
Titanium Oxide ($TiO_2$): 30 to 50%;
Silicon Oxide ($SiO_2$): 25 to 40%;
Chromium Oxide ($Cr_2O_3$): 10 to 20%;
Nickel Oxide (NiO): 5 to 15%; and
Copper Oxide (CuO): 5 to 15%.

According to a preferred aspect of the present invention there is provided a penetration enhancing activating flux formulation in paste form for Tungsten Inert Gas (TIG) welding for Austenitic Stainless Steel comprising:

A penetration enhancing activating flux composition comprising Titanium Oxide ($TiO_2$): 30 to 50%; Silicon Oxide ($SiO_2$): 25 to 40%; Chromium Oxide ($Cr_2O_3$): 10 to 20%; Nickel Oxide (NiO): 5 to 15%; Copper Oxide (CuO): 5 to 15%;

A binder material comprising Sodium Silicate; and

A solvent media comprising Acetone.

In the above disclosed penetration enhancing activating flux formulation in paste form the proportions of the flux composition: binder material: solvent media is selectively in the range of 0.75 to 1.25 gram: 1 to 3 drops: 5 to 10 milliliter respectively.

In accordance with a preferred aspect in the said penetration enhancing activating flux formulation in paste form of the invention the proportions of the flux composition: binder material: solvent media is selectively 1 gram: 2 drops: 5 to 10 milliliter respectively.

In accordance with another aspect of the present invention there is provided a method of carrying out Tungsten Inert Gas (TIG) welding of Austenitic Stainless Steel using a penetration enhancing activating flux formulation comprising:

Providing the penetration enhancing activating flux formulation in paste form comprising using a flux composition comprising Titanium Oxide ($TiO_2$): 30 to 50%; Silicon Oxide ($SiO_2$): 25 to 40%; Chromium Oxide ($Cr_2O_3$): 10 to 20%; Nickel Oxide (NiO): 5 to 15%; Copper Oxide (CuO): 5 to 15%; a binder material comprising Sodium Silicate; and a solvent media comprising Acetone as a penetration enhancing activity flux (PEAF) paste;

Applying the said PEAF paste on the joint area; and

Finally carrying out the PEAF-TIG welding.

Preferably, in the above method of carrying out Tungsten Inert Gas (TIG) welding of the invention the PEAF paste is applied to the joint area having a thickness such that the base plate is not visible preferably by using a brush.

Importantly, in the above method of the invention the Tungsten Inert Gas (TIG) welding can be carried out without filler metal addition with maximum infiltration of upto 12 mm in a single pass. Also, it is possible to carry out penetration of more than 12 mm in a single pass with reduced requirement of consumables or filler wire in a square butt joint of austenitic stainless steel.

In accordance with another aspect of the present invention there is provided parameters for carrying out Tungsten Inert Gas (TIG) welding with the above discussed enhanced penetration in particular upto about 12 mm weld bead penetration in a single pass involving the selective penetration enhancing activating flux composition and using welding conditions including welding current of 275 to 325 amperes preferably about 300 amperes, welding voltage of 17 to 22 volts preferably about 19-20 volts, welding speed of 55 to 65 millimeters per minute preferably about 58 millimeters per minute and shielding Argon gas flow rate of 8 to 12 liters per minute preferably about 10 liters per minute.

In particular, according to yet further aspect of the invention in the above method of carrying out Tungsten Inert Gas (TIG) welding for welding plates of thickness above 9 mm and up to 12 mm there is provided back up strip to prevent melt through in the weld joint area and avoid back purging for autogenous PEAF-TIG welding. For welding plates of thickness in the range of 6 to 9 mm the same is carried out by back purging of Argon at a flow rate of 8 to 10 liters per minute.

In accordance with yet further aspect of the present invention there is provided a austenitic stainless steel weld joined products comprising Tungsten Inert Gas (TIG) welded joint wherein the weld joint is obtained of a selective flux comprising Titanium Oxide ($TiO_2$): 30 to 50%; Silicon Oxide ($SiO_2$): 25 to 40%; Chromium Oxide ($Cr_2O_3$): 10 to 20%; Nickel Oxide (NiO): 5 to 15%; Copper Oxide (CuO): 5 to 15%; binder material comprising Sodium Silicate; and solvent media comprising Acetone having welds free of any deterioration by said flux.

Importantly, it is found that the said Austenitic Stainless Steel weld joined products obtained as above with said weld joint is free of any inter-granular corrosion.

Thus by way of the present invention it is possible to provide for the Penetration Enhancing Activating Flux (PEAF) which can be applied in paste form on the weld joint surfaces prior to welding, for square butt welding of austenitic stainless steel sections by autogenous TIG welding process, alternatively termed as PEAF-TIG process, to achieve enhanced weld penetration exceeding the conventional limit of 3 mm by about 300%, in a single welding pass.

Importantly also by way of the said PEAF paste for use in autogenous TIG welding process of selective austenitic stainless steel sections to achieve enhanced weld penetration exceeding the conventional limit by 300% over the limit of 3 mm in conventional TIG process, use of the said flux advantageously mitigated the problem of variable weld bead penetration due to variations in base metal composition for different heats.

The autogenous TIG welding combined with application of PEAF paste with a brush on the weld surface of square butt joint preparation prior to welding, also provides for welding parameters to achieve the enhanced penetration over conventional process by about 300%, and for achieving butt weld joints of plate thickness range 6 mm to 12 mm, and preferably maximum of 12 mm penetration, in a single weld pass comprised:

In particular, the weld parameters that selectively include back purging of argon gas at a flow rate of 8-10 liters per minute when welding was carried out on plate thickness range of 6 mm-9 mm to avoid oxidation and melt through and whereas for thicknesses above 9 mm and upto 12 mm, use of backing strip was employed to achieve full penetration and prevent melt through.

Advantageously according to a preferred aspect of the present invention, the autogenous TIG welding of austenitic stainless steels with application of PEAF paste on weld surface prior to welding eliminating consumption of filler wire, used the combination of selective weld parameters such that penetration up to about 12 mm could be achieved, reducing the cost of weld joint edge preparation, reduced welding time and thus reduced the overall weld cost of such welding.

Importantly, the application of PEAF paste on weld surface prior to welding in combination with the selective weld parameters ensured quality conforming to radiographic quality acceptance standard of the resulting butt welded bead, without degrading from the expected favoured microstructure and mechanical properties of the welded joint and the parent metals.

The details of the invention its objects and advantages are explained hereunder in greater detail in relation to non-limiting exemplary illustrations as per the following accompanying figures:

BRIEF DESCRIPTION OF THE ACCOMPANYING FIGURES

Figure 2:
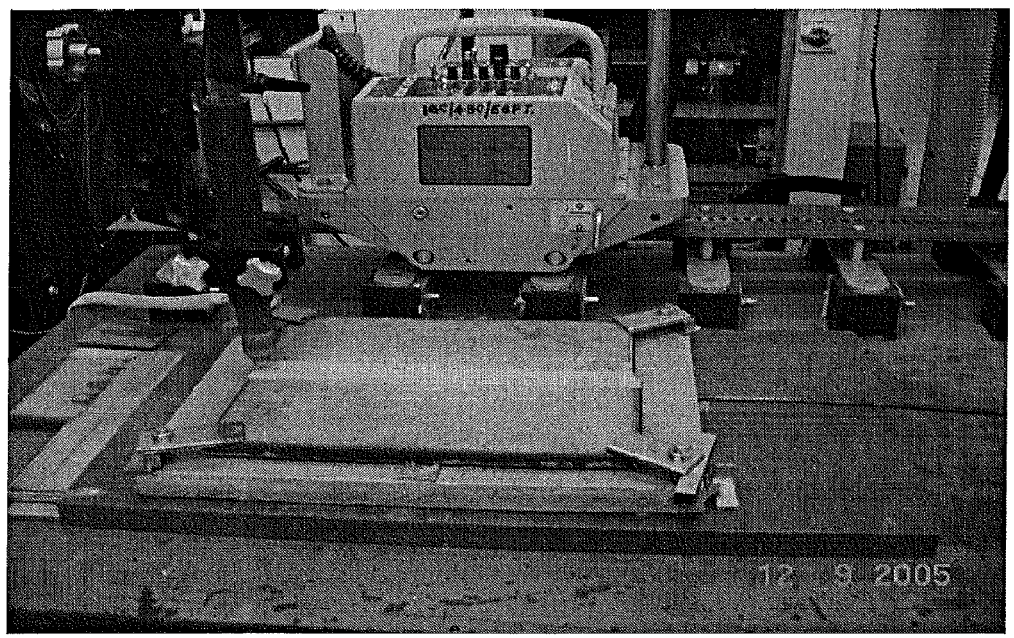
Figure 2:
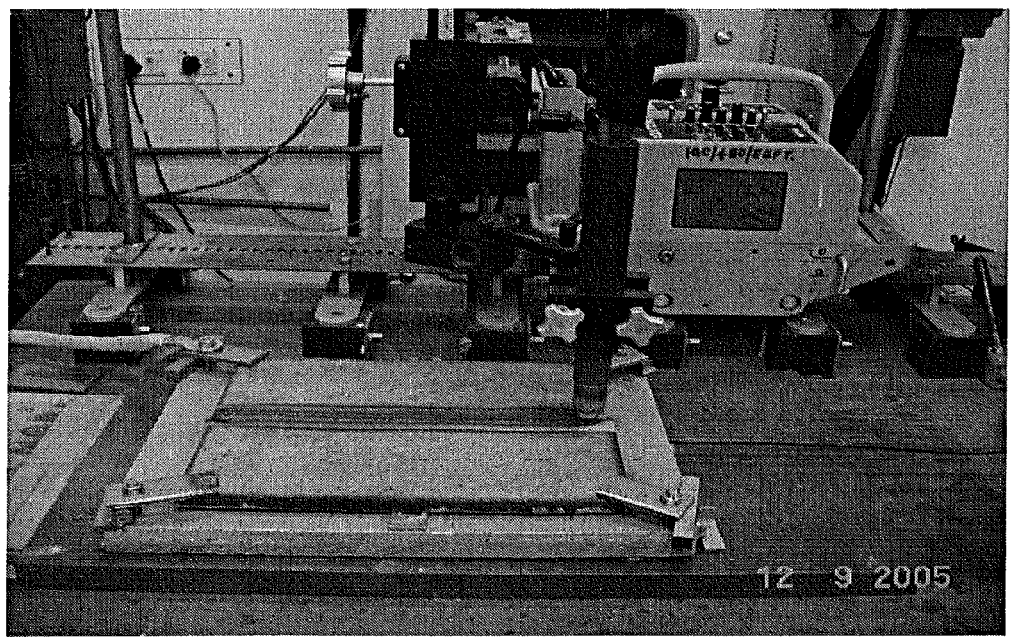
Figure 3:
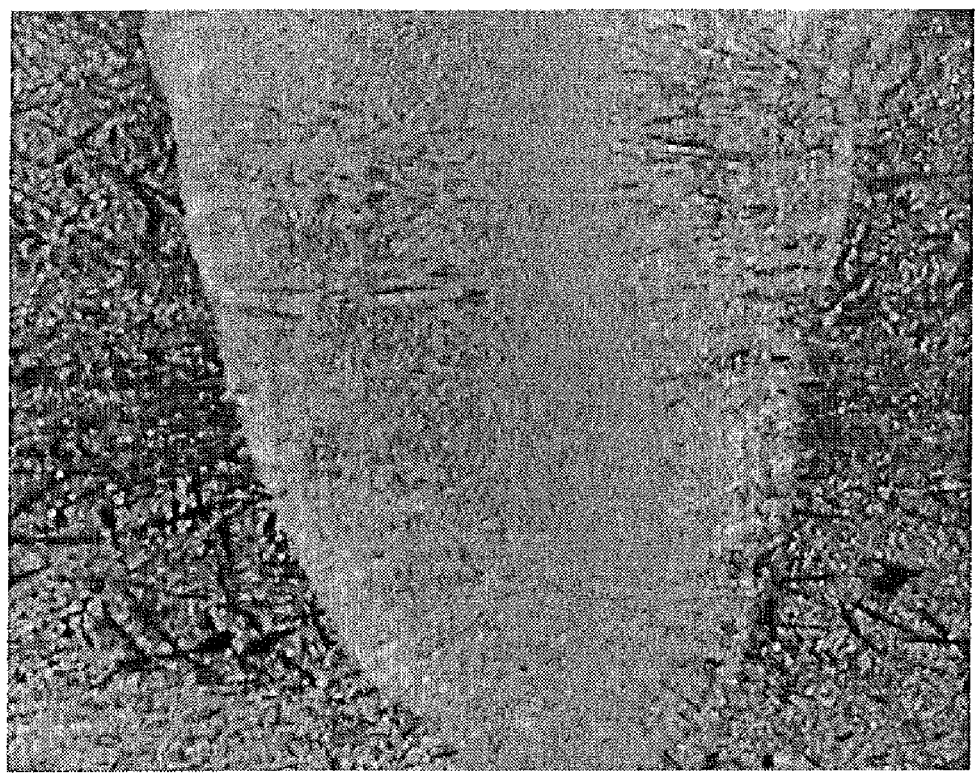

FIG. 1(a)—illustrates the application of PEAF paste with a brush on prepared weld surfaces in accordance with the invention;

FIG. 1(b)—illustrates a joint ready with PEAF paste applied on it for subsequent TIG welding in accordance with the invention;

FIG. 1(c)—is an illustration of the top face of completed autogenous PEAF-TIG weld bead obtained in accordance with the present invention;

FIG. 1(d)—is an illustration of the bottom face of completed PEAF-TIG weld bead obtained in accordance with the present invention;

FIG. 2(a)—shows the arrangement of PEAF-TIG weld of square butt joint of 12 mm thick 316LN SS plate after PEAF paste application and prior to autogenous TIG welding;

FIG. 2(b)—shows the completed weld bead for square butt joint of 12 mm thick 316LN SS plate after autogenous PEAF-TIG welding;

FIG. 3—shows a 12 mm thick 316LN stainless steel (SS) plates' weld cross-section illustrating complete penetration after autogenous PEAF-TIG welding.

DETAILED DESCRIPTION OF THE INVENTION WITH REFERENCE TO ACCOMPANYING FIGURES

Example I

Under this Example a process of TIG welding using PEAF paste in accordance with the invention was carried out on square-butt joint for 9 mm thick 316LN SS as detailed hereunder:

Reference is first invited to the accompanying FIG. 1(a), where a pair of 9 mm thick stainless steel (SS) type 316LN plates with edge preparation as required, is shown to be clamped on a fixture to form the fit-up for the square butt joint to be welded by autogenous TIG welding. The picture also illustrates the method of application of the said Penetration Enhancing Activating Flux (PEAF) in paste form in accordance with the present invention.

For the purposes of this illustrative embodiment, the selective formulation of the flux comprised of:

A PEAF mixture each gram of which contained:
Titanium Oxide ($TiO_2$): 30 to 50%
Silicon Oxide ($SiO_2$): 25 to 40%
Chromium Oxide ($Cr_2O_3$): 10 to 20%
Nickel Oxide (NiO): 5 to 15%
Copper Oxide (CuO): 5 to 15%

After mixing the above PEAF flux powder thoroughly to achieve homogeneity, a few drops preferably 2 drops, for each gram of flux mixture, of sodium silicate binder are added and mixed thoroughly. Then a liquid solvent acetone is added in the proportion of 5-10 milliliters per gram of the flux mixture and stirred to make it in the form of homogenous PEAF paste, ready to be applied on the weld surfaces.

The PEAF paste thus obtained was next applied to the top surface of the plates in the joint area as shown in FIG. 1(a) by using a brush. The thickness of the PEAF paste on the plate was obtained such that the base plate is not visible. The joint was thus made ready for subsequent welding by TIG process, as shown in the FIG. 1(b).

Next, the autogenous TIG process, without addition of any filler material wire, was used to weld the said joint thus prepared in a single pass, following the selective welding parameters as detailed hereunder:
Number of weld pass: one;
Welding current: 300 amperes;
Welding voltage: 19-20 volts;
Welding speed: 58 millimeters per minute;
Flow rate of Shielding Argon gas: 10 liters per minute;
Back purging of Argon to prevent oxidation and melt through: 8-10 liters per minute.

After the welding was completed and cooled to room temperature the joint was ready for testing/check up of desired end results. FIGS. 1(c) and 1(d) shows the two faces of the completed square butt joint and the full penetration was observed as shown in FIG. 1(d).

Example II

Under this Example a process of TIG welding using PEAF paste in accordance with the invention was carried out on 12 mm thick 316LN SS as detailed hereunder:
For the purposes of this illustrative embodiment, the selective formulation of the flux comprised of:
A PEAF mixture each gram of which contained:
Titanium Oxide ($TiO_2$): 30 to 50%
Silicon Oxide ($SiO_2$): 25 to 40%
Chromium Oxide ($Cr_2O_3$): 10 to 20%
Nickel Oxide (NiO): 5 to 15%
Copper Oxide (CuO): 5 to 15%

After mixing the above PEAF flux powder thoroughly to achieve homogeneity, a few drops, preferably 2 drops for each gram of flux mixture, of sodium silicate binder are added and mixed thoroughly. Then a liquid solvent acetone is added in the proportion of 5-10 milliliters per gram of the flux mixture and stirred to make it in the form of homogenous PEAF paste, ready to be applied on the weld surfaces.

The PEAF paste thus obtained was next applied to the top surface of the plates in the joint area as shown in FIG. 2(a). The thickness of the PEAF paste on the plate was obtained such that the base plate is not visible. The joint was thus made ready for subsequent welding by TIG process, as shown in the FIG. 2(b).

The said joint thus obtained was in a single pass, following the selective welding parameters as detailed hereunder:
Number of weld pass: one;
Welding current: 300 amperes;
Welding voltage: 19-20 volts;
Welding speed: 58 millimeters per minute,
Flow rate of Shielding Argon gas: 10 liters per minute In case of the above welding carried out for a thickness of 12 mm thick 316LN SS, a back-up strip was used to avoid melt through. In accordance with an aspect of the invention, the use of backing strip for plates of thicknesses above 9 mm and up to 12 mm to prevent melt through is proposed instead of back purging with Argon gas, which was not possible under the conventional TIG welding process. The FIG. 3 shows the normal cross-section of the square butt welded joint wherein the complete penetration was observed in PEAF-TIG welding of the 12 mm thick 316LN SS plates, in a single weld pass.

Moreover, PEAF-TIG welds of 304LN and 316LN SS plates obtained in accordance with the present invention were subjected to Inter Granular Corrosion tests as per ASTM A262 Practice E, which confirmed that the weld joints obtained in accordance with the invention passed the IGC test and were not susceptible to IGC in the as welded condition.

It is thus possible by way of the present invention to provide a Penetration Enhancing Activating Flux (PEAF) formulation preferably obtained as paste and to a method of carrying out Tungsten Inert Gas (TIG) welding or alternatively termed, Gas Tungsten Arc Welding (GTAW) of Stainless Steels of grades and composition conforming to austenitic stainless steel especially the Standards AISI 304 and AISI 316. Importantly, the penetration enhancing activating flux (PEAF) formulation of the invention favours obtaining consistently superior weld quality, of section thickness up to around 12 mm in single pass welding, with an enhancement of about 300% weld penetration, as compared to conventional similar TIG welding applications. Furthermore, the present invention would favour reducing the requirement of consumable filler material while carrying out TIG welding of austenitic stainless steel of section thickness above 3 mm, being the limit of penetration achieved in conventional TIG welding, and to reduce the number of weld passes. The invention would ensure radiographic quality welds with higher productivity and reduced overall welding costs without sacrificing important mechanical properties and the desired microstructure of the weld zone. Importantly, also the PEAF paste of the invention for the autogenous TIG welding process, also takes care of problems faced in the art of variable weld bead penetration with the variation in the base metal composition from one heat to the another and is directed to serve for simple and cost-effective fast, quality and reliable weld joints with reduced distortions in weld joints.

We claim:

1. A penetration enhancing activating flux formulation for Tungsten Inert Gas (TIG) welding of Austenitic Stainless Steel without filler metal addition with maximum penetration of up to about 12 mm in a single pass comprising:
Titanium Oxide ($TiO_2$): 30 to 50%;
Silicon Oxide ($SiO_2$): 25 to 40%;
Chromium Oxide ($Cr_2O_3$): 10 to 20%;
Nickel Oxide (NiO): 5 to 15%; and
Copper Oxide (CuO): 5 to 15%.

2. A penetration enhancing activating flux formulation in paste form for Tungsten Inert Gas (TIG) welding for Austenitic Stainless Steel without filler metal addition with maximum penetration of up to about 12 mm in a single pass comprising:
a penetration enhancing activating flux composition comprising Titanium Oxide ($TiO_2$): 30 to 50%; Silicon Oxide ($SiO_2$): 25 to 40%; Chromium Oxide ($Cr_2O_3$): 10 to 20%; Nickel Oxide (NiO): 5 to 15%; Copper Oxide (CuO): 5 to 15%;
a binder material comprising Sodium Silicate; and
a solvent media comprising Acetone.

3. The penetration enhancing activating flux formulation in paste form as claimed in claim 2 wherein proportions of the flux composition: binder material: solvent media is selectively in the range of 0.75 to 1.25 gram: 1 to 3 drops: 5 to 10 milliliter respectively.

4. The penetration enhancing activating flux formulation in paste form as claimed in claim 3 wherein the proportions of the flux composition: binder material: solvent media is selectively 1 gram: 2 drops: 5 to 10 milliliters respectively.

5. A method of carrying out Tungsten Inert Gas (TIG) welding of Austenitic Stainless Steel in a joint area, without filler metal addition with maximum penetration of up to about 12 mm in a single pass comprising:
providing a penetration enhancing activating flux (PEAF) as PEAF paste form obtained of said flux composition comprising Titanium Oxide ($TiO_2$): 30 to 50%; Silicon Oxide ($SiO_2$): 25 to 40%; Chromium Oxide ($Cr_2O_3$): 10 to 20%; Nickel Oxide (NiO): 5 to 15%; Copper Oxide (CuO): 5 to 15%; a binder material comprising Sodium Silicate; and a solvent media comprising Acetone;

applying the said PEAF paste on the joint area; and finally carrying out PEAF-TIG welding by selecting appropriate welding parameters compatible to plate thickness and specification.

6. The method of carrying out Tungsten Inert Gas (TIG) welding as claimed in claim 5 wherein the PEAF paste is applied to the joint area using a brush having a thickness such that the base plate is not visible.

7. The method of carrying out Tungsten Inert Gas (TIG) welding as claimed in claim 5 carried out without filler metal addition with maximum penetration of up to about 12 mm in a single pass.

8. The method of carrying out Tungsten Inert Gas (TIG) welding as claimed in claim 5 carried out with penetration of greater than 12 mm in a single pass with reduced requirement of consumables or filler wire in a square butt joint of said austenitic stainless steel.

9. The method of carrying out Tungsten Inert Gas (TIG) welding as claimed in claim 7 comprising carrying out about 12 mm weld bead penetration in a single pass using welding conditions including welding current of 275 to 325 amperes, welding voltage of 17 to 22 volts, welding speed of 55 to 65 millimeters per minute and shielding Argon gas flow rate of 8 to 12 liters per minute.

10. The method of carrying out Tungsten Inert Gas (TIG) welding as claimed in claim 5 wherein for welding plates of thickness above 9 mm and up to 12 mm there is provided back up strip to prevent melt through in the weld joint area and avoid back purging during said PEAF-TIG welding carried out without said filler metal addition.

11. The method of carrying out Tungsten Inert Gas (TIG) welding as claimed in claim 5 wherein for welding plates of thickness in the range of 6 to 9 mm carrying out back purging of Argon at a flow rate of 8 to 10 liters per minute.

12. The method according to claim 9, wherein said welding current is about 300 amperes.

13. The method according to claim 9, wherein said welding voltage is about 19-20 volts.

14. The method according to claim 9, wherein said welding speed is about 58 millimeters per minute.

15. The method according to claim 9, wherein said shielding Argon gas flow rate is about 10 liters per minute.

\* \* \* \* \*